United States Patent
Hendry et al.

(10) Patent No.: US 9,529,646 B2
(45) Date of Patent: *Dec. 27, 2016

(54) POWER-EFFICIENT INTERACTION BETWEEN MULTIPLE PROCESSORS

(71) Applicant: Apple Inc., Cupertino, CA (US)

(72) Inventors: Ian Hendry, San Jose, CA (US); Anthony G. Sumpter, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 428 days.

This patent is subject to a terminal disclaimer.

(21) Appl. No.: 13/920,320

(22) Filed: Jun. 18, 2013

(65) Prior Publication Data

US 2013/0283290 A1    Oct. 24, 2013

Related U.S. Application Data

(63) Continuation of application No. 12/509,413, filed on Jul. 24, 2009, now Pat. No. 8,484,647.

(51) Int. Cl.
| | |
|---|---|
| *G06F 9/54* | (2006.01) |
| *G06F 9/38* | (2006.01) |
| *G06F 9/48* | (2006.01) |
| *G06F 9/50* | (2006.01) |

(52) U.S. Cl.
CPC .............. *G06F 9/54* (2013.01); *G06F 9/3879* (2013.01); *G06F 9/4812* (2013.01); *G06F 9/5027* (2013.01); *G06F 2209/509* (2013.01); *Y02B 60/142* (2013.01); *Y02B 60/144* (2013.01)

(58) Field of Classification Search
None
See application file for complete search history.

(56) References Cited

U.S. PATENT DOCUMENTS

| | | | |
|---|---|---|---|
| 5,414,858 A * | 5/1995 | Hoffman et al. | ............... 710/48 |
| 6,715,005 B1 | 3/2004 | Rodriguez et al. | |
| 7,015,915 B1 | 3/2006 | Diard | |
| 7,075,541 B2 | 7/2006 | Diard | |
| 7,234,144 B2 | 6/2007 | Wilt et al. | |
| 7,256,788 B1 * | 8/2007 | Luu et al. | ..................... 345/501 |
| 7,392,399 B2 | 6/2008 | Grohoski et al. | |
| 8,032,658 B2 | 10/2011 | Tripathi | |
| 8,555,292 B2 * | 10/2013 | Haba | ....................... G06F 9/544 |
| | | | 709/213 |
| 2002/0099964 A1 * | 7/2002 | Zdravkovic | ................... 713/320 |

(Continued)

*Primary Examiner* — Meng An
*Assistant Examiner* — Michael Ayers
(74) *Attorney, Agent, or Firm* — Meyertons, Hood, Kivlin, Kowert & Goetzel, P.C.

(57) ABSTRACT

A technique for processing instructions in an electronic system is provided. In one embodiment, a processor of the electronic system may submit a unit of work to a queue accessible by a coprocessor, such as a graphics processing unit. The coprocessor may process work from the queue, and write a completion record into a memory accessible by the processor. The electronic system may be configured to switch between a polling mode and an interrupt mode based on progress made by the coprocessor in processing the work. In one embodiment, the processor may switch from an interrupt mode to a polling mode upon completion of a threshold amount of work by the coprocessor. Various additional methods, systems, and computer program products are also provided.

8 Claims, 8 Drawing Sheets

(56) References Cited

U.S. PATENT DOCUMENTS

2004/0153636 A1 8/2004 Kamiya et al.
2007/0091102 A1 4/2007 Brothers et al.
2008/0301687 A1 12/2008 Gosalia et al.

\* cited by examiner

POWER-EFFICIENT INTERACTION BETWEEN MULTIPLE PROCESSORS

PRIORITY INFORMATION

This invention is a continuation application of U.S. patent application Ser. No. 12/509,413, entitled "SELECTIVELY ADJUSTING CPU WAIT MODE BASED ON ESTIMATION OF REMAINING WORK BEFORE TASK COMPLETION ON GPU", filed Jul. 24, 2009.

BACKGROUND

1. Technical Field

The present disclosure relates generally to the interaction of multiple processors in an electronic system and, in some embodiments, to reducing power consumption in a computer system having a central processing unit and a coprocessor.

2. Description of the Related Art

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Many electronic systems, such as desktop, laptop, or handheld computer systems, portable media players, and mobile phones, include at least one processor for executing instructions to provide various functionalities to a user. For example, in computer systems, central processing units (CPUs) may be used to execute software applications, which may include, for example, operating systems, productivity software, antivirus software, multimedia players, and games. Some electronic systems may actually include multiple processors, such as a CPU and a coprocessor, to increase the processing capabilities of such systems.

For example, in addition to one or more CPUs, a computer system may also include one or more graphics processing units (GPUs). These GPUs may be adapted to efficiently perform graphics rendering functions, allowing rendering tasks (or other tasks) to be offloaded from the CPUs to the GPUs of such systems. While a GPU (or other coprocessor) is performing certain processing tasks, such as graphics rendering for a particular application, a CPU may wait for the GPU to complete such tasks before resuming operations or continuing a current thread of execution. In some instances, the CPU may wait for the GPU in an interrupt mode, in which the CPU waits to receive an interrupt from the GPU when the GPU completes its work or requires additional information from the CPU. In other instances, the CPU may wait for the GPU in a polling mode, in which the CPU continuously polls the GPU to inquire its status. In many instances, operating in the polling mode may result in decreased latency and improved performance in comparison to operating in the interrupt mode, but may also result in reduced power and processing efficiency.

SUMMARY

Certain aspects of embodiments disclosed herein by way of example are summarized below. It should be understood that these aspects are presented merely to provide the reader with a brief summary of certain forms an invention disclosed and/or claimed herein might take, and that these aspects are not intended to limit the scope of any invention disclosed and/or claimed herein. Indeed, any invention disclosed and/or claimed herein may encompass a variety of aspects that may not be set forth below.

The present disclosure generally relates to a technique for processing data in an electronic system including multiple processors and, in some embodiments, to power-efficient interaction between such processors. The multiple processors may include a CPU and a GPU, although other types and combinations of processors may be used in full accordance with the present technique. The CPU may assign work, such as rendering tasks, to the GPU for processing. The CPU may then wait for completion of assigned work by the GPU. Also, the GPU may report its progress in processing the assigned work, such as by writing a completion record to a memory of the system accessible by the CPU. In some embodiments, the system may dynamically switch between an interrupt mode and a polling mode based on the progress made by the GPU in processing the assigned work.

Various refinements of the features noted above may exist in relation to various aspects of the present invention. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of embodiments of the present invention without limitation to the claimed subject matter.

BRIEF DESCRIPTION OF THE DRAWINGS

Advantages of the present disclosure may become apparent upon reading the following detailed description and upon reference to the drawings in which.

DETAILED DESCRIPTION OF SPECIFIC EMBODIMENTS

One or more specific embodiments will be described below. These described embodiments are provided only by way of example, and do not limit the scope of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments described below, the articles "a," "an," and "the" are intended to mean that there are one or more of the elements. The terms "comprising," "including," and "having" are intended to be inclusive and mean that there may be additional elements other than the listed elements. Moreover, while the term "exemplary" may be used herein in connection to certain examples of aspects or embodiments of the presently disclosed subject matter, it will be appreciated that these examples are illustrative in nature and that the term "exemplary" is not used herein to denote any preference or requirement with respect to a disclosed aspect or embodiment. Additionally, it should be understood that references to "one embodiment," "an embodiment," "some embodiments," and the like are not intended to be interpreted as excluding the existence of additional embodiments that also incorporate the disclosed features.

The present application is generally directed to interaction between multiple processors, such as a CPU and a coprocessor (e.g., a GPU, a physics processing unit (PPU), etc.), in an electronic system. In some embodiments, a first processor assigns work to the second processor for completion. The second processor may process the assigned work and provide progress updates to the first processor, such as by writing indications of progress to a memory accessible by the first processor. In some embodiments, the first processor may dynamically switch between interrupt and polling modes during processing of the assigned work by the second processor based on the reported progress. More particularly, in one embodiment in which the first processor waits for the second processor to complete assigned work, the first processor operates in an interrupt mode when the second processor has completed less than a threshold amount of one or more assigned units of work, and operates in a polling mode when the second processor has completed more than the threshold amount. Accordingly, the first processor may generally save power by operating in an interrupt waiting mode when the second processor is relatively far from completing assigned unit(s) of work, but may exhibit improved performance (e.g., lower latency) by operating in a polling waiting mode when the second processor is sufficiently close to completing the assigned unit(s) of work.

Figure 1:
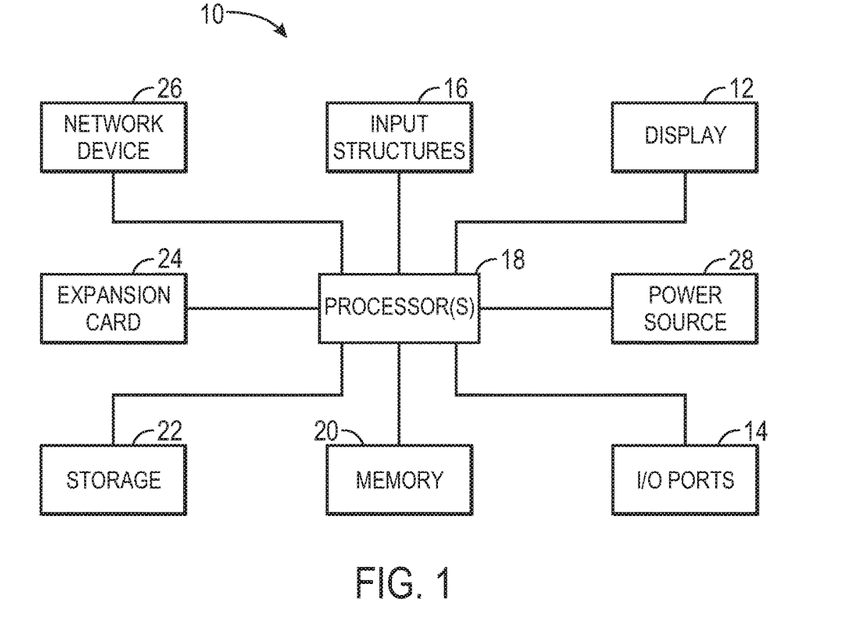
FIG. 1 is a block diagram of exemplary components of an electronic device, in accordance with aspects of the present disclosure.

With these foregoing features in mind, a general description of electronic devices suitable for use with the present techniques is provided below. An example of a suitable electronic device may include various internal and/or external components which contribute to the function of the device. For instance, FIG. 1 is a block diagram illustrating components that may be present in one such electronic device 10, and which may allow device 10 to function in accordance with the techniques discussed herein. Those of ordinary skill in the art will appreciate that the various functional blocks shown in FIG. 1 may include hardware elements (including circuitry), software elements (including computer code stored on a computer-readable medium, such as a hard drive or system memory), or a combination of both hardware and software elements. It should further be noted that FIG. 1 is merely one example of a particular implementation and is merely intended to illustrate the types of components that may be present in electronic device 10. For example, in the presently illustrated embodiment, these components may include display 12, I/O ports 14, input structures 16, one or more processors 18, memory device 20, non-volatile storage 22, expansion card(s) 24, networking device 26, and power source 28.

With regard to each of these components, it is first noted that display 12 may be used to display various images generated by device 10. In various embodiments, display 12 may be a liquid crystal display (LCD), a cathode ray tube (CRT) display, or any other suitable display. Additionally, in certain embodiments of electronic device 10, display 12 may be provided in conjunction with a touch-sensitive element, such as a touchscreen, that may be used as part of the control interface for device 10.

I/O ports 14 may include ports configured to connect to a variety of external devices, such as a power source, headset or headphones, or other electronic devices (such as handheld devices and/or computers, printers, projectors, external displays, modems, docking stations, and so forth). I/O ports 14 may support any interface type, such as a universal serial bus (USB) port, a video port, a serial connection port, an IEEE-1394 port, an Ethernet or modem port, and/or an AC/DC power connection port.

Input structures 16 may include the various devices, circuitry, and pathways by which user input or feedback is provided to processor(s) 18. Such input structures 16 may be configured to control a function of electronic device 10, applications running on device 10, and/or any interfaces or devices connected to or used by device 10. For example, input structures 16 may allow a user to navigate a displayed user interface or application interface. Non-limiting examples of input structures 16 include buttons, sliders, switches, control pads, keys, knobs, scroll wheels, keyboards, mice, touchpads, and so forth. User interaction with input structures 16, such as to interact with a user or application interface displayed on display 12, may generate electrical signals indicative of user input. These input signals may be routed via suitable pathways, such as an input hub or bus, to processor(s) 18 for further processing.

Additionally, in certain embodiments, one or more input structures 16 may be provided together with display 12, such an in the case of a touchscreen, in which a touch sensitive mechanism is provided in conjunction with display 12. In such embodiments, the user may select or interact with displayed interface elements via the touch sensitive mechanism. In this way, the displayed interface may provide interactive functionality, allowing a user to navigate the displayed interface by touching display 12.

Processor(s) 18 may provide the processing capability to execute the operating system, programs, user and application interfaces, and any other functions of the electronic device 10. Processor(s) 18 may include one or more microprocessors, such as one or more "general-purpose" microprocessors, one or more special-purpose microprocessors and/or ASICS, or some combination of such processing components. For example, processor(s) 18 may include one or more reduced instruction set (RISC) processors, as well as graphics processors, video processors, audio processors, and the like. As will be appreciated, processor(s) 18 may be communicatively coupled to one or more data buses or chipsets for transferring data and instructions between various components of electronic device 10.

Programs or instructions executed by processor(s) 18 may be stored in any suitable manufacture that includes one or more tangible, computer-readable media at least collectively storing the executed instructions or routines, such as, but not limited to, the memory devices and storage devices described below. Also, these programs (e.g., an operating system) encoded on such a computer program product may also include instructions that may be executed by processor(s) 18 to enable device 10 to provide various functionalities, including those described herein.

The instructions or data to be processed by processor(s) 18 may be stored in a computer-readable medium, such as memory 20. Memory 20 may include a volatile memory, such as random access memory (RAM), and/or a non-volatile memory, such as read-only memory (ROM). Memory 20 may store a variety of information and may be used for various purposes. For example, memory 20 may store firmware for electronic device 10 (such as basic input/output system (BIOS)), an operating system, and various other programs, applications, or routines that may be executed on electronic device 10. In addition, memory 20 may be used for buffering or caching during operation of the electronic device 10.

The components of device 10 may further include other forms of computer-readable media, such as non-volatile storage 22 for persistent storage of data and/or instructions. Non-volatile storage 22 may include, for example, flash memory, a hard drive, or any other optical, magnetic, and/or solid-state storage media. Non-volatile storage 22 may be used to store firmware, data files, software programs, wireless connection information, and any other suitable data.

The embodiment illustrated in FIG. 1 may also include one or more card or expansion slots. The card slots may be configured to receive one or more expansion cards 24 that may be used to add functionality, such as additional memory, I/O functionality, or networking capability, to electronic device 10. Such expansion cards 24 may connect to device 10 through any type of suitable connector, and may be accessed internally or external to the housing of electronic device 10. For example, in one embodiment, expansion cards 24 may include a flash memory card, such as a SecureDigital (SD) card, mini- or microSD, CompactFlash card, Multimedia card (MMC), or the like. Additionally, expansion cards 24 may include one or more processor(s) 18 of the device 10, such as a video graphics card having a GPU for facilitating graphical rendering by device 10.

The components depicted in FIG. 1 also include network device 26, such as a network controller or a network interface card (NIC). In one embodiment, network device 26 may be a wireless NIC providing wireless connectivity over any 802.11 standard or any other suitable wireless networking standard. Network device 26 may allow electronic device 10 to communicate over a network, such as a personal area network (PAN), a local area network (LAN), a wide area network (WAN), or the Internet. Further, electronic device 10 may connect to and send or receive data with any device on the network, such as portable electronic devices, personal computers, printers, and so forth. Alternatively, in some embodiments, electronic device 10 may not include a network device 26. In such an embodiment, a NIC may be added as one expansion card 24 to provide similar networking capability as described above.

Further, device 10 may also include power source 28. In one embodiment, power source 28 may be one or more batteries, such as a lithium-ion polymer battery or other type of suitable battery. The battery may be user-removable or may be secured within the housing of electronic device 10, and may be rechargeable. Additionally, power source 28 may include AC power, such as provided by an electrical outlet, and electronic device 10 may be connected to power source 28 via a power adapter. This power adapter may also be used to recharge one or more batteries of device 10.

Figure 2:
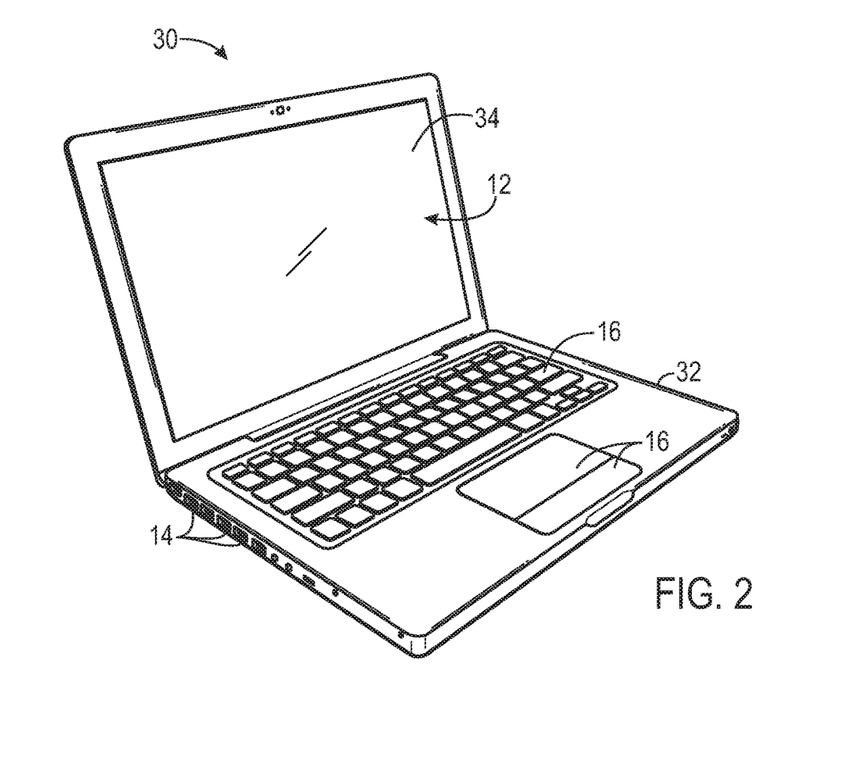
FIG. 2 is a perspective view of a computer in accordance with aspects of the present disclosure.

Electronic device 10 may take the form of a computer system, as generally depicted In FIG. 2, or some other type of electronic device. Such computers may include computers that are generally portable (such as laptop, notebook, tablet, and handheld computers), as well as computers that are generally used in one place (such as conventional desktop computers, workstations and/or servers). In certain embodiments, electronic device 10 in the form of a computer may be a model of a MacBook®, MacBook® Pro, MacBook Air®, iMac®, Mac® mini, or Mac Pro® available from Apple Inc. of Cupertino, Calif. By way of example, electronic device 10 in the form of a laptop computer 30 is illustrated in FIG. 2 in accordance with one embodiment. The depicted computer 30 includes housing 32, display 12 (such as depicted LCD panel 34), input/output ports 14, and input structures 16.

In one embodiment, input structures 16 (such as a keyboard and/or touchpad) may be used to interact with computer 30, such as to start, control, or operate a graphical user interface (GUI) or applications running on computer 30. For example, a keyboard and/or touchpad may allow a user to navigate a user interface or application interface displayed on display 12.

As depicted, electronic device 10 in the form of computer 30 may also include various I/O ports 14 to allow connection of additional devices. For example, I/O ports 14 may include a USB port, a DVI port, or some other port suitable for connecting to another electronic device, a projector, a supplemental display, and so forth. In addition, computer 30 may include network connectivity, memory, and storage capabilities, as described with respect to FIG. 1. As a result, computer 30 may store and execute a GUI and other applications.

Although electronic device 10 is generally depicted in the context of a computer in FIG. 2, electronic device 10 may also take the form of other types of electronic devices. In some embodiments, various electronic devices 10 may include cellular telephones, media players for playing music and/or video, personal data organizers, handheld game platforms, cameras, and/or combinations of such devices. For instance, device 10 may be provided in the form of a cellular telephone that includes various additional functionalities (such as the ability to take pictures, record audio and/or video, listen to music, play games, network connectivity, and so forth). By way of further example, device 10 may be a model of an iPod® or iPhone® available from Apple Inc.

Figure 3:
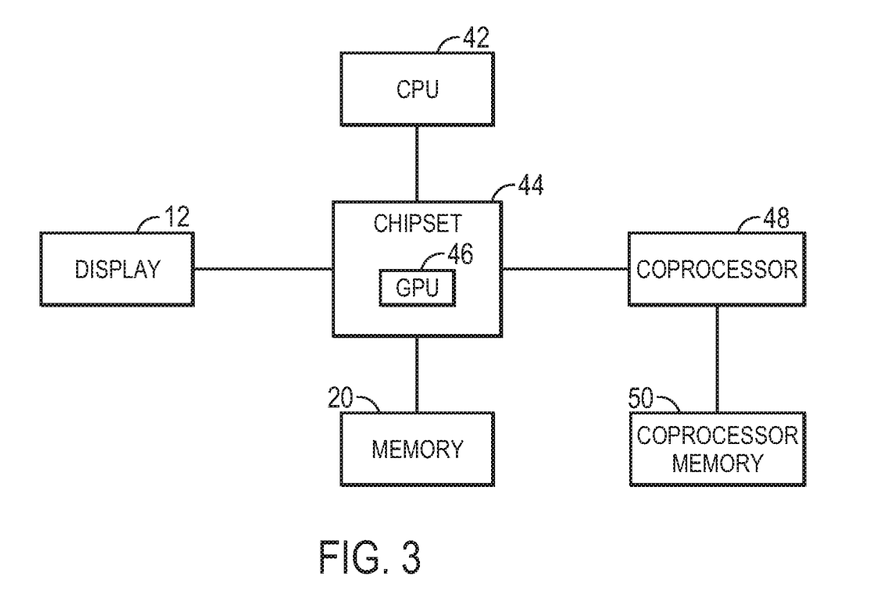
FIG. 3 is a block diagram of a system including multiple processors in accordance with aspects of the present disclosure.

As previously noted, computer systems or other electronic devices may include multiple processors for carrying out various functionalities. By way of example, one such system 40 including multiple processors is generally represented as a block diagram in FIG. 3 in accordance with one embodiment. For the sake of clarity, only certain components of system 40 are depicted in FIG. 3, although it will be appreciated that system 40 may include a wide variety of additional components, such as any or all of the various other components depicted in FIG. 1 and described above.

System 40 includes a first processor, such as CPU 42, operatively coupled to chipset 44, which facilitates routing of communications between CPU 42 and other components of system 40. In various embodiments, chipset 44 may be a single-chip chipset or may include multiple chips (e.g., a northbridge and a southbridge). Such chipsets are commercially available from various suppliers, including NVIDIA Corporation and Intel Corporation, both of Santa Clara, Calif. In one embodiment, chipset 44 includes a GeForce® 9400M chipset from NVIDIA Corporation, although other suitable chipsets may be used in accordance with the present techniques.

System 40 may also include one or more GPUs, such as GPU 46, that may generally drive display 12 by rendering graphics to be displayed thereon. For instance, GPU 46 may process commands and data to define characteristics of images output to display 12, such as geometry, lighting, shading, texturing, or the like. In some embodiments, such as that presently depicted in FIG. 3, GPU 46 may be an integrated GPU (also referred to as an on-board GPU) that is integrated with chipset 44. In other embodiments, GPU 46 may be a dedicated processing unit that is not integrated with chipset 44, and may have dedicated resources, such as video memory. By way of example, where expansion card 24 includes a video graphics card, GPU 46 may be provided thereon.

As will be appreciated, GPU 46 may include 2D and 3D processing capabilities and may include video memory, such as shared memory (e.g., memory 20) or some generation of Graphics Double Data Rate (GDDR) memory. Such video memory may be used as frame buffers, texture maps, array storage, or for other suitable information. Additionally, GPU 46 may include any number of rendering pipelines and may be programmable for specific features for 3D processing, e.g., programmable shaders. For example, GPU 46 may be capable of executing instructions encoded using a 3D programming API, such as OpenGL, DirectX, or any other suitable API. In some embodiments, GPU 46 may be a GPU manufactured by NVIDIA Corporation of Santa Clara, Calif., Advanced Micro Devices, Inc. of Sunnyvale, Calif., and/or Intel Corporation of Santa Clara, Calif. Further, GPU 46 may include any number of inputs and outputs and may drive an external display in addition to or instead of display 12.

System 40 may include coprocessor 48 for handling additional tasks within system 40. For instance, coprocessor 48 may include a GPU, a PPU, a signal processing processor, or any other processor that facilitates operation of system 40. In one embodiment, coprocessor 48 includes a GPU, which may be provided in addition to GPU 46. Further, in such an embodiment, GPU 46 may be considered a "lower-power" GPU and coprocessor 48 may include a "higher-power" GPU. For instance, a lower-power GPU may have less processing power (e.g., lower clock speed, lower throughput, fewer pipelines, less video memory, etc.) and may consume less power than a higher-power GPU which, in comparison, may have more processing capabilities and consume more power than a lower-power GPU. In one embodiment, coprocessor 48 may include a GeForce® 9600M GT discrete GPU available from NVIDIA Corporation, although coprocessor 48 may also or instead embody other suitable GPUs or other types of coprocessors. It is noted, however, that in various other embodiments GPU 46 or coprocessor 48 may be omitted from system 40, or system 40 may include additional coprocessors 48, such as additional graphics processing units. Additionally, system 40 may also include dedicated coprocessor memory 50 available to coprocessor 48. For example, in an embodiment in which coprocessor 48 includes a GPU, coprocessor memory 50 may include GPU memory, as discussed below with respect to FIG. 7. Coprocessor memory 50 may include RAM or any other suitable memory device.

Figure 4:
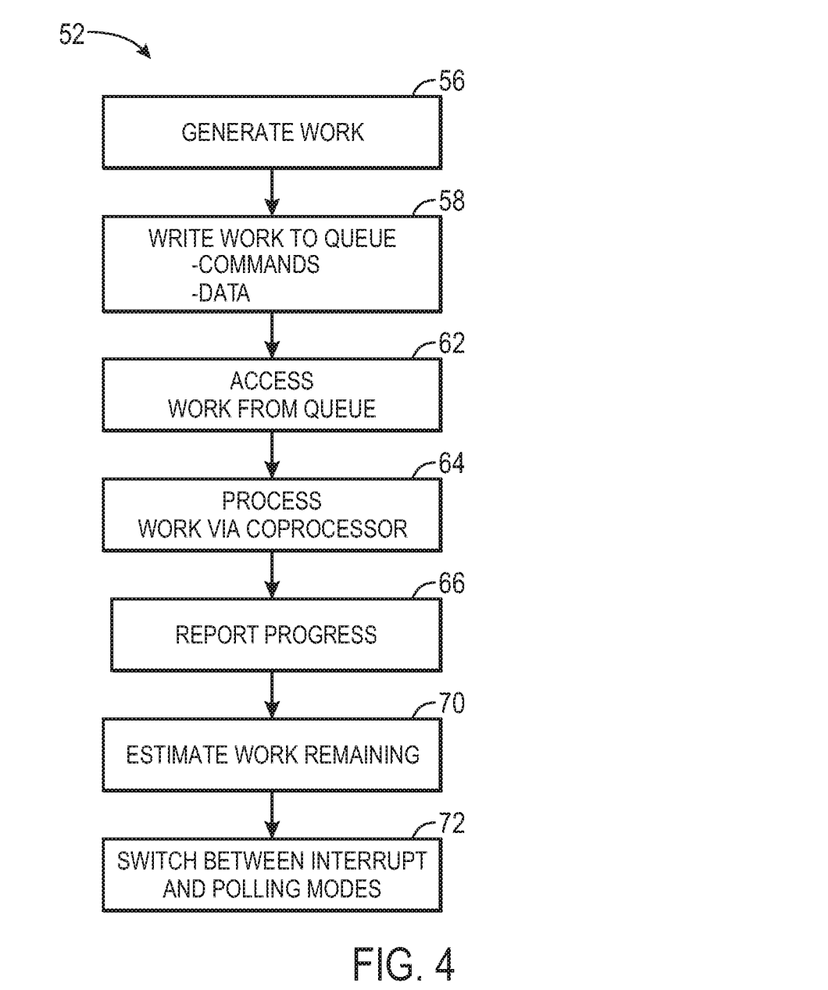
FIG. 4 is flowchart of a method for operating the system of FIG. 3 in accordance with aspects of the present disclosure.

In accordance with one embodiment, an electronic system, such as system 40, may switch between an interrupt mode and a polling mode during processing of work by a coprocessor, such as GPU 46 or coprocessor 48. As generally depicted in FIG. 4, in one embodiment an electronic system (e.g., system 40) may be operated in accordance with method 52. Such operation may be better understood with additional reference to functional diagram 54 provided in FIG. 5 in accordance with one embodiment. While functional diagram 54 depicts interaction between CPU 42 and coprocessor 48, it will be appreciated that the same interaction may occur between various processors, such as CPU 42 and some other coprocessor (e.g., GPU 46), or two general-purpose processors.

Method 52 includes generating units of work or tasks to be performed by a coprocessor (e.g., GPU 46 or coprocessor 48), as generally indicated by reference numeral 56, and such work may be written to a queue of work, as generally indicated by reference numeral 58. For example, with reference to FIG. 5, CPU 42 may generate units of work, which may be written to a queue of work, such as command buffer 60, within a memory accessible by coprocessor 48 (or GPU 46), such as memory 20. As discussed in greater detail below, the generated work may include commands and data to be processed by coprocessor 48. Further, coprocessor 48 may access work from the queue (e.g., command buffer 60) and commence processing of the accessed work, as generally indicated by reference numerals 62 and 64, respectively.

Figure 5:
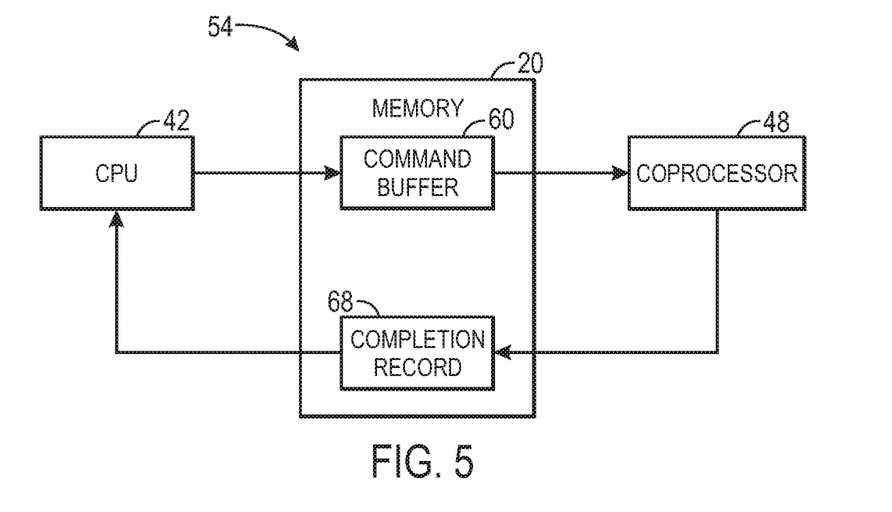
FIG. 5 is a functional diagram generally depicting the writing of commands to a command buffer and the writing of a completion record in accordance with aspects of the present disclosure.

In accordance with method 52, coprocessor 48 may report its progress in processing the accessed work, as generally indicated by reference numeral 66. In one embodiment, such reporting by coprocessor 48 may include writing an indication of the progress to completion record 68 in a memory accessible by CPU 42, such as memory 20 or cache memory of CPU 42. In the presently illustrated embodiment, completion record 68 is included within the same memory 20 as command buffer 60. It is noted, however, that in other embodiments, completion record 68 and command buffer 60 may be provided in different memory devices, or either or both of completion record 68 and command buffer 60 may be distributed across multiple memory devices. Method 52 additionally includes estimating an amount of work remaining to be performed by coprocessor 48 and switching between interrupt and polling modes based on the estimated amount of work remaining, as generally indicated by reference numerals 70 and 72. As discussed in greater detail below, switching between such modes may facilitate power conservation while allowing a desired level of performance to be maintained.

Figure 6:
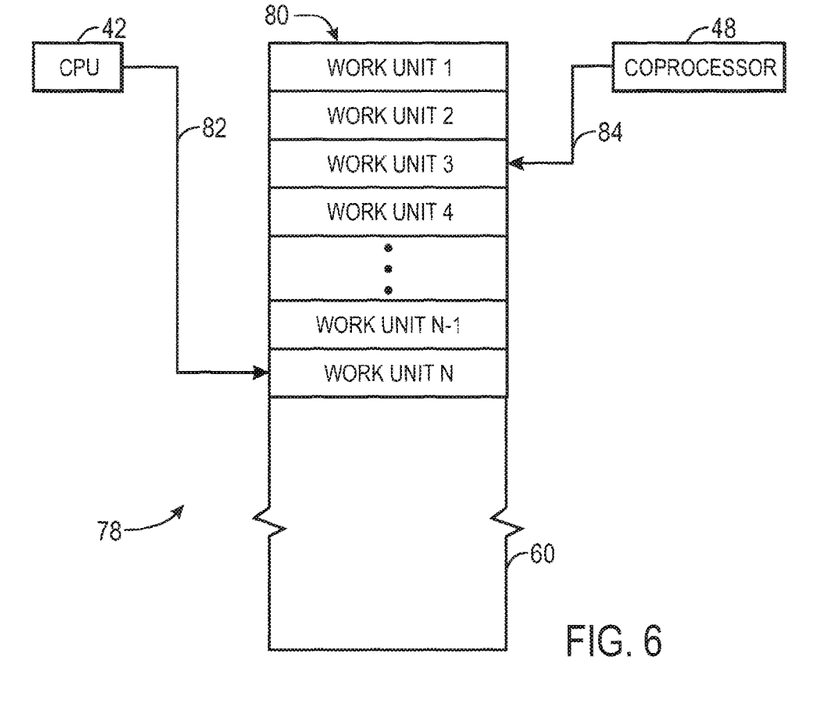
FIG. 6 is a block diagram generally depicting the writing of work into a command buffer by a CPU, and the accessing of such work by a coprocessor, in accordance with aspects of the present disclosure.

Additional details regarding interaction between CPU 42, coprocessor 48 (or GPU 46), and command buffer 60 are provided in block diagram 78, which is generally depicted in FIG. 6 in accordance with one embodiment. Command buffer 60 may include one or more work units 80 that have been assigned to coprocessor 48 (or GPU 46) for processing. In one embodiment, each work unit 80 includes a series of commands for execution by coprocessor 48. Work units 80 may also include references to memory locations within system 40, such as within memory 20, containing data pertinent to and referenced by one or more commands in work units 80. In other embodiments, such data or other data may also or instead be written directly into command buffer 60, such as within work units 80 themselves. CPU 42, or some other processor, may generate units of work 80 and write them to command buffer 60 at a location generally indicated by write pointer 82. Conversely, coprocessor 48 may access work units written to command buffer 60, as generally indicated by read pointer 84. It is further noted that coprocessor 48 may process work units 80 asynchronously with respect to CPU 42.

Figure 7:
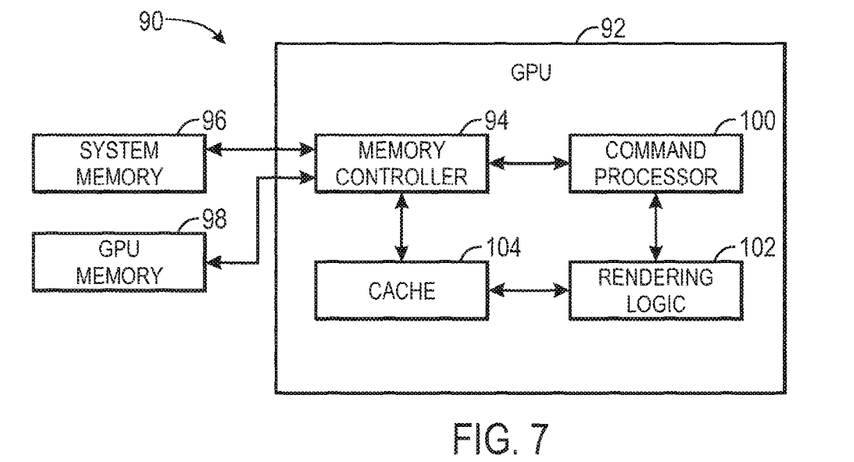
FIG. 7 is a block diagram depicting additional details with respect to one example of a GPU in accordance with aspects of the present disclosure.

Additional details regarding operation of a graphics processing unit may be better understood with reference to block diagram 90 generally illustrated in FIG. 7 in accordance with one embodiment. GPU 92 may include various components to facilitate access of data and commands from other components of a host system (e.g., system 40), and for performing various processing tasks, such as those related to graphical rendering. In one embodiment, GPU 92 includes memory controller 94, which may control various input/output functions of GPU 92, including accessing data from and writing data to various memory devices.

For instance, memory controller 94 may include a direct memory access (DMA) controller that generates DMA requests to access memory locations within host system memory 96, which may include command buffer 60 and completion record 68. Further, in embodiments in which GPU 92 includes local GPU memory 98 distinct from system memory 96, memory controller 94 may also access data from, or write data to, local GPU memory 98. Memory controller 94 may also access work units 80 from command buffer 60, as described above. Command processor 100, in the present embodiment, consumes commands from work units 80 and distributes the work from such units to various rendering logic 102. As will be appreciated, rendering logic 102 may include various components for processing graphical data, such as vertex shaders, pixels shaders, floating point units, and the like. In some embodiments, GPU 92 may include cache memory 104 for temporarily storing data used by, or generated from, other components of GPU 92.

Figure 8:
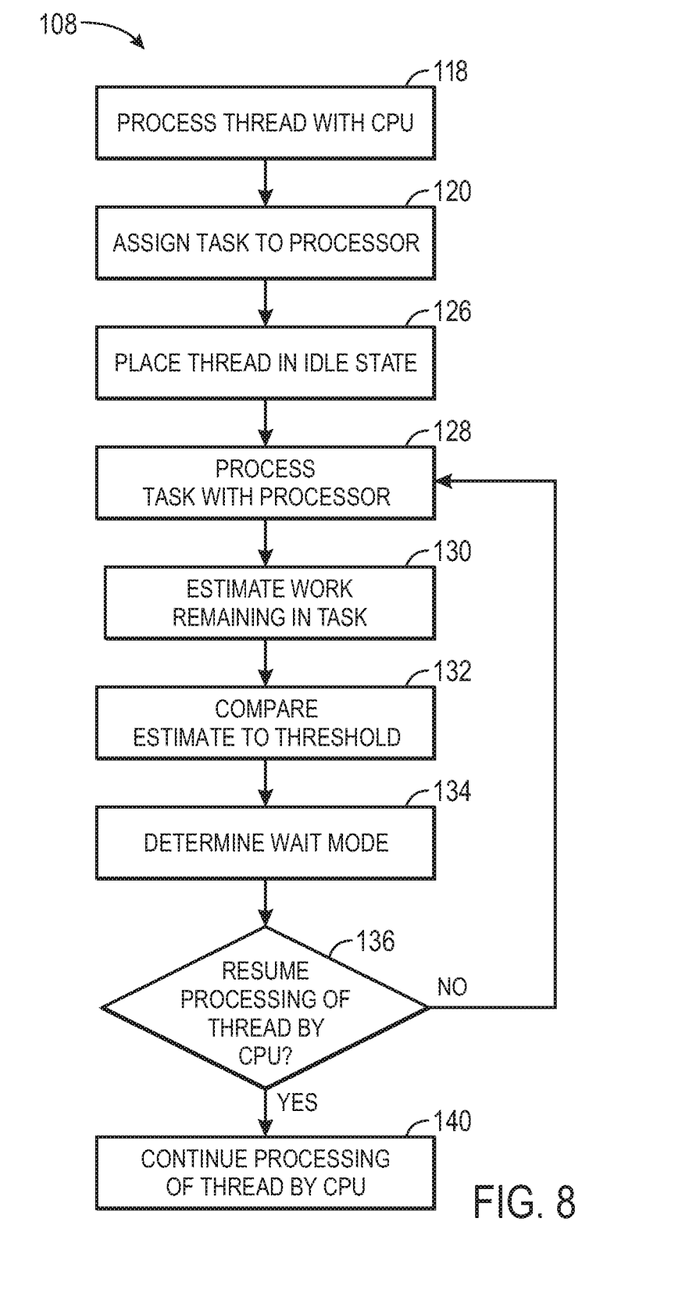
FIG. 8 is a flowchart of a method for determining a wait mode of a CPU in accordance with aspects of the present disclosure.

Interaction between a CPU and a coprocessor within a computer system may also be performed via method 108 in accordance with one embodiment, as generally depicted in FIG. 8. Aspects of method 108 may be better understood with reference to diagram 110 of FIG. 9, which generally depicts processing of instructions by a CPU and a GPU (indicated by reference numerals 112 and 114, respectively) over time (indicated by reference numeral 116). Such processing may include execution of a software application, such as a graphics application, in which certain tasks are completed by the CPU and other tasks are completed by the GPU.

Figure 9:
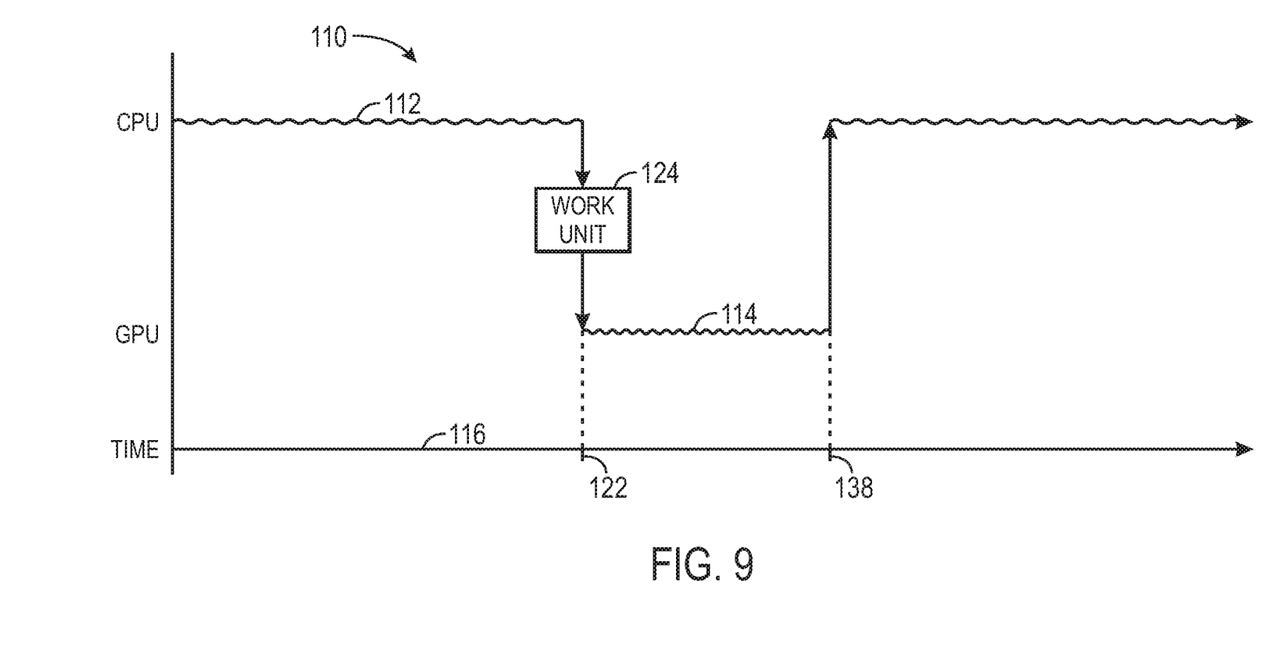
FIG. 9 is a diagram representative of CPU and GPU processing related to a thread of execution in accordance with aspects of the present disclosure.

Method 108 may include processing a current thread of execution (e.g., of a graphics application) with a first processor (e.g., CPU 42), and assigning one or more tasks related to the thread of execution to a coprocessor (e.g., GPU 92), as generally indicated by reference numerals 118 and 120. For example, at time 122, CPU 42 may assign work unit 124 to GPU 92 for processing. In some instances, CPU 42 may assign tasks to GPU 92 (or some other coprocessor) at a rate faster than the capabilities of GPU 92 to complete the assigned tasks. In such an instance, the current thread of execution may be placed in an idle state by CPU 42, as generally indicated by reference numeral 126, while waiting for GPU 92 to process the tasks, as generally indicated by reference numeral 128.

An amount of work remaining in the task(s) to be processed by GPU 92 may be estimated, as generally indicated by reference numeral 130. It is noted that the estimate of work remaining may include an estimate as to the amount of work remaining until one or more particular units of work are completed, one or more specific system resources are available (e.g., memory address space containing instructions and/or data for the assigned work), and so forth, and that references herein to completion of work may refer to any of these instances. Subsequently, the estimated amount of work may be compared to a threshold, as generally indicated by reference numeral 132, to determine the manner in which CPU 42 waits for completion of some or all of the tasks assigned to GPU 92, as generally indicated by reference numeral 134.

For instance, in one embodiment, the comparison threshold may be generally indicative of a point in processing of the assigned tasks at which CPU 42 is to switch from an interrupt mode to a polling mode, and CPU 42 may switch between such modes based on the comparison. In various embodiments, the threshold may be a quantity of work remaining (e.g., one block of work remaining, multiple blocks of work remaining, a fraction of a block of work remaining), an amount of time expected until completion of one or more work units, or the like, and CPU 42 may switch to a polling mode when GPU 92 nears completion of one or more work units of interest. In another embodiment, determining the wait mode may include setting a timer of CPU 42 that will trigger switching of CPU 42 from an interrupt mode to a polling mode once the set amount of time has elapsed. Additionally, system 40 may utilize various heuristics to estimate the amount of work remaining, which may be based on historic or application-specific data, average sizes or completion times of previously completed units of work, and so forth.

Further, in at least one embodiment, the threshold may be changed based on various operational modes or settings of the system 40. For example, system 40 may allow the user to designate an operational performance mode, such as a "high performance" mode or a "power conservation" mode. In such an embodiment, the comparison threshold may be varied such that CPU 42 would remain in an interrupt mode longer when in "power conservation" mode than it would be when in "high performance" mode.

As indicated by decision block 136, method 108 may also include determining whether to maintain thread of execution 112 in an idle state, in which case CPU 42 may continue to wait for completion of additional work by GPU 92, or to resume processing of thread 112 by CPU 42 at time 138, as generally indicated by reference numeral 140. In some embodiments, CPU 42 may resume processing the thread in response to an interrupt from GPU 92 or the passage of a certain amount of time (i.e., a timeout event).

Figure 10:
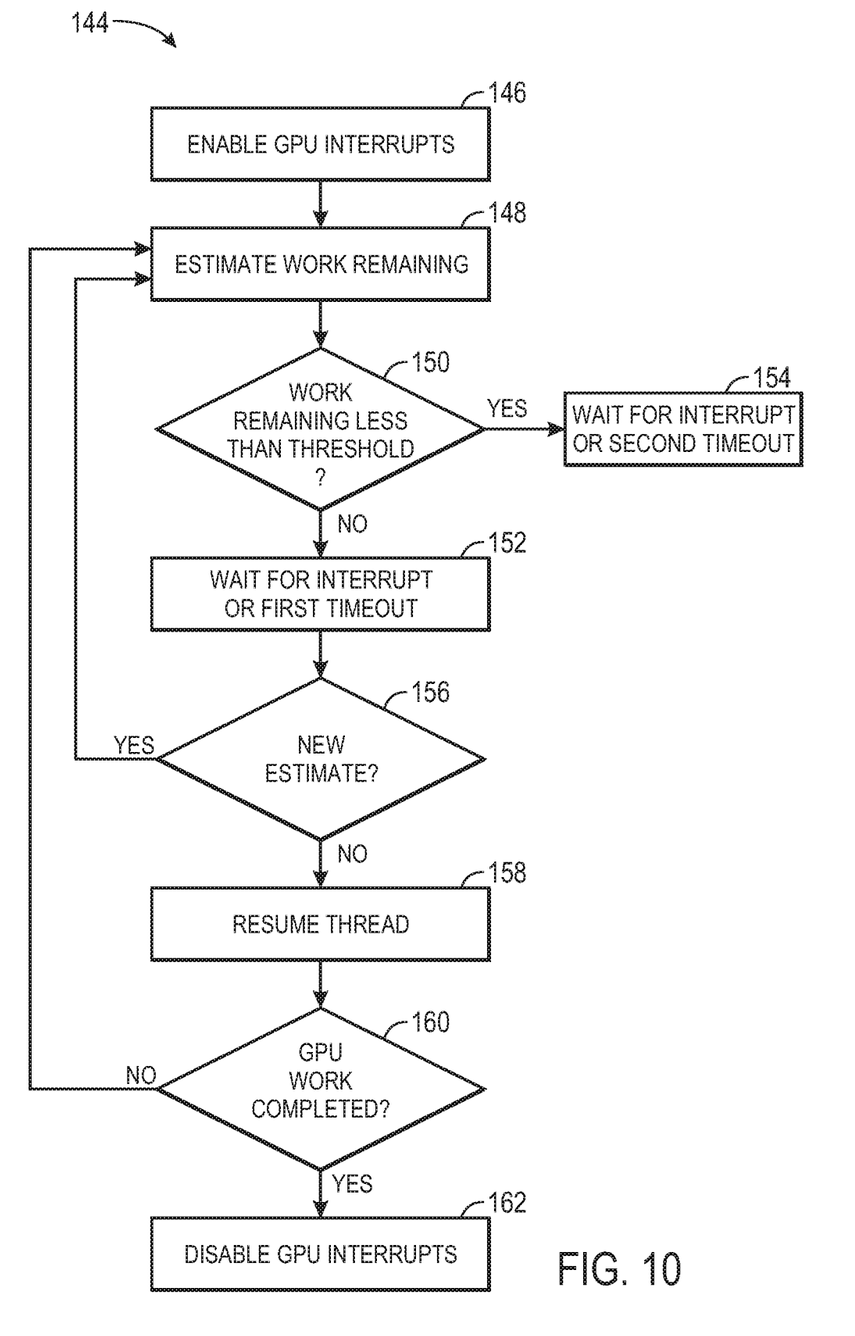
FIG. 10 is another flowchart including additional details with respect to managing a wait mode of a CPU in accordance with aspects of the present disclosure.

In FIG. 10, method 144 for managing the wait mode of CPU 42 is provided in accordance with one embodiment. It is noted that signaling of interrupts to CPU 42 by GPU 92 (or some other coprocessor) may be controlled by one or more commands present in the work submitted to GPU 92.

Further, in some embodiments, the ability of GPU 92 to generate interrupts in CPU 42 may be dynamically enabled and disabled to control when GPU 92 may interrupt CPU 42, such that GPU 92 does not interrupt CPU 42 for the completion of every unit of work. Accordingly, method 144 may include enabling GPU interrupts, as generally indicated in block 146.

Method 144 may also include estimating an amount of work remaining to be processed by GPU 92, as generally discussed above and presently indicated by reference numeral 148. As also noted above, such an estimate may be compared to a threshold, and the waiting mode of CPU 42 may be controlled based on such a comparison. For instance, as generally indicated by decision block 150, if the estimated amount of work remaining is not less than the threshold, CPU 42 may be operated in an interrupt mode in which CPU 42 waits for an interrupt signal from GPU 92 or a timeout event, as generally indicated by reference numeral 152. If, however, the estimated amount of work remaining is less than the threshold, CPU 42 may operate in a polling mode, in which CPU 42 waits for an interrupt signal from GPU 92 or a different timeout event, as generally indicated by reference numeral 154. The estimation of work remaining and comparison to the threshold may be iterative, as generally indicated by decision block 156, allowing CPU 42 to change between waiting modes based on the comparison.

The amount of elapsed time associated with the timeout event in the polling mode may be less than that associated with the timeout event in the interrupt mode. For instance, when in a polling mode, the timeout event may be associated with an elapsed amount of time, such as tens of microseconds, that is less than, and in some cases substantially less than, the duration of elapsed time that will trigger a timeout event in the interrupt mode, such as one or more milliseconds. In various embodiments, the timeout for an interrupt mode may be slightly longer in duration than that of the polling mode, or may be two times, three times, five times, ten times, twenty times, fifty times, one hundred times, or even greater. Further, the amount of elapsed time associated with a timeout event in the polling mode may be less than an interrupt latency of system 40 and CPU 42. Additionally, the inclusion of a timeout condition in the interrupt mode may generally ensure that CPU 42 does not wait indefinitely for an interrupt, thus potentially avoiding "freezing" of an application in the event of an error in which an interrupt is not generated by GPU 92 and/or processed by CPU 42. In one embodiment, the durations of time associated with the timeout events may also be varied based on operational modes or settings of the system 40, such as the "high performance" and "power conservation" performance modes discussed above.

In either mode, upon detection of an interrupt signal or a timeout event, CPU 42 may continue processing of thread 112, such as by handling an interrupt generated by GPU 92 or a timeout event, polling GPU 92, continuing to generate additional units of work for GPU 92, executing instructions in the thread 112, or the like, as generally indicated by reference numeral 158. The amount of work remaining may continue to be estimated until GPU 92 completes its assigned work, at which time one or more commands may be provided to GPU 92 to disable its interrupt capability, as generally indicated in blocks 160 and 162, respectively. In one embodiment, the interrupt capability of GPU 92 may be selectively enabled when CPU 42 is waiting on results and disabled at other times to reduce the likelihood of an interrupt storm.

Further, in some embodiments, interrupt latency of a host system (e.g., system 40) may be managed in conjunction with the present techniques. It is noted that interrupt latency is the time that elapses from when an interrupt causing event occurs in a hardware device (e.g., GPU 92) to when software code waiting for that event resumes execution. In some embodiments, the host system (such as via an operating system) may provide one or more services to negotiate interrupt latency, interrupt priorities, or both. For instance, in one embodiment, the host system may provide the interrupt latency time as an input for controlling various processes, such as that described above with respect to enabling and disabling interrupt capabilities. Also, in one embodiment, a maximum interrupt latency may be negotiated with the operating system to generally ensure that performance is maintained at or above a desired level. Additionally, in some embodiments, the interrupt latency may be controlled indirectly by response priorities for the interrupts.

Figure 11:
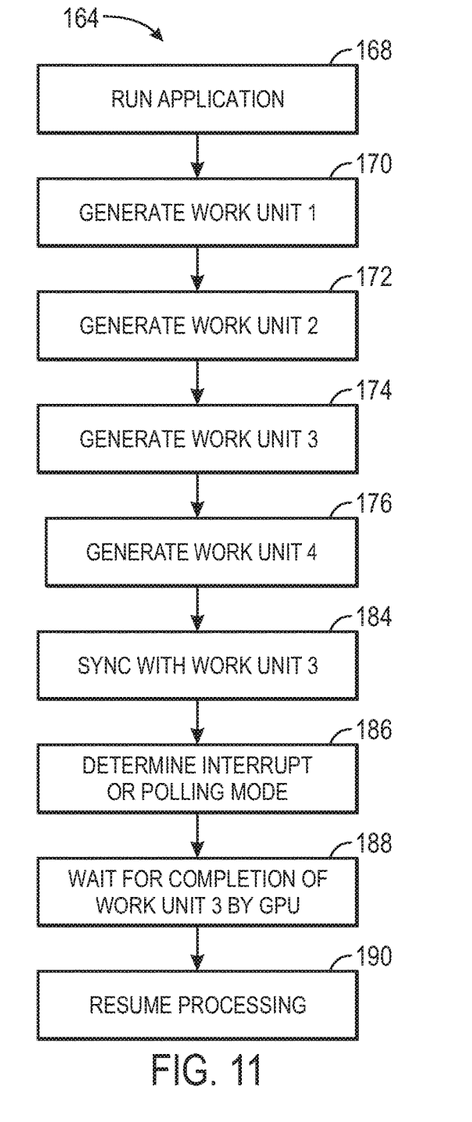
FIG. 11 is a flowchart depicting a method of operation of a CPU in accordance with aspects of the present disclosure.
Figure 12:
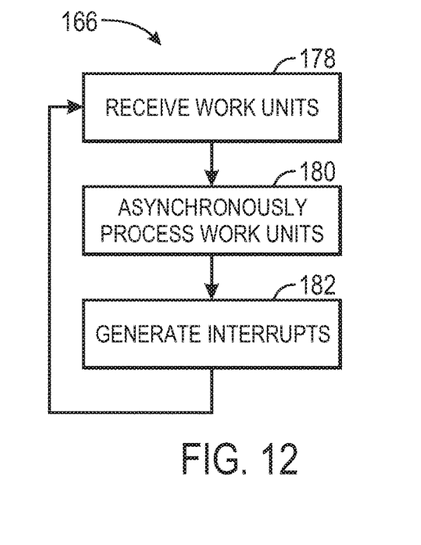
FIG. 12 is a flowchart depicting a method of operation of a GPU in accordance with aspects of the present disclosure.

Further details of potential interaction between CPU 42 and GPU 92 may be better understood with reference to operational methods 164 and 166 generally depicted in FIGS. 11 and 12 in accordance with one embodiment. Method 166 includes running an application, such as a game, as generally indicated by reference numeral 168. CPU 42, or some other processor, may generate units of work for GPU 92 as generally described above and indicated by reference numerals 170, 172, 174, and 176. For example, the generated work units may include graphics rendering tasks that may be more efficiently performed by GPU 92 than by CPU 42. GPU 92 may receive work units and asynchronously process such units, as generally indicated by reference numerals 178 and 180.

At various stages during such processing, such as upon completion of one or more work units, reaching of a milestone in completion of such work units, detection of an error, or the like, GPU 92 may generate interrupts in CPU 42, as generally indicated by reference numeral 182. It is noted, however, that CPU 42 may assign units of work to GPU 92 at a rate faster than that which GPU 92 can complete the assigned work. For instance, GPU 92 may generate and assign Work Unit 1, Work Unit 2, Work Unit 3, and Work Unit 4 before GPU 92 completes processing of even Work Unit 1. If CPU 42 continuously writes units of work to a work queue (e.g., command buffer 60) at a rate faster than GPU 92 can process such work, CPU 42 may eventually fill the queue. For this and other reasons, it may be desirable in some instances to synchronize operation of CPU 42 and GPU 92.

Accordingly, method 164 may include a synchronization step, as generally indicated by reference numeral 184, in which CPU 42 waits for GPU 92 to complete Work Unit 3 before continuing processing of its current thread or application. As generally indicated by reference numeral 186, an interrupt or polling waiting mode may be determined, such as by the above described techniques. As also noted above, CPU 42 may switch between interrupt and polling modes depending on the extent to which GPU 92 has completed its work. CPU 42 may wait for completion of Work Unit 3 by GPU 92, or for an interrupt from GPU 92 or timeout event, and may then resume processing, as generally indicated by respective reference numerals 188 and 190.

The specific embodiments described above have been shown by way of example, and it should be understood that these embodiments may be susceptible to various modifications and alternative forms. It should be further understood that the present techniques are not intended to be limited to the particular forms disclosed, but rather to cover all modifications, equivalents, and alternatives falling within the spirit and scope of this disclosure.

What is claimed is:

1. A system, comprising:
a graphics processing unit (GPU);
a central processing unit (CPU) configured to:
process an execution thread; and
generate a plurality of work units related to the execution thread,
wherein each work unit includes one or more associated processing tasks;
write each of the work units to a buffer;
assign one or more of the plurality of work units to the GPU;
halt processing of the execution thread;
enter an interrupt mode from a polling mode; and
wherein the GPU is configured to:
access the one or more of the plurality of work units from the buffer;
execute the one or more associated processing tasks included in each one of the one or more of the plurality of work units;
write an indication of progress of executing the one or more associated processing tasks included in each of the one or more of the plurality of work units in a memory; and
send an interrupt signal to the CPU dependent upon completion of a subset of the one or more work units, wherein a particular work unit is complete when the one or more associated processing tasks included in the particular work unit have finished executing;
wherein the CPU is further configured to:
repeatedly read the indication of progress from the memory; and
estimate an amount of work remaining to be performed by the GPU based on the indication of progress;
switch from the interrupt mode to the polling mode in response to a determination that the amount of work remaining is less than a threshold value, wherein the threshold value is dependent upon an operational mode of the CPU, and wherein the operational mode is one of at least a high performance mode or a low performance mode;
while operating in the interrupt mode, resume processing of the execution thread in response to a determination that a first time period has elapsed or in response to receiving the interrupt signal; and
while operating in the polling mode, resume processing of the execution thread in response to a determination that a second time period has elapsed or in response to receiving the interrupt signal, wherein the second time period is less than the first time period.

2. The system of claim 1, wherein the CPU is further configured to synchronize operation with the GPU.

3. The system of claim 2, where the CPU is further configured to switch from the interrupt mode to the polling mode dependent upon a timeout event.

4. A method of operating a computing system, comprising:
processing an execution thread by a central processing unit (CPU);
generating, by the CPU, a plurality of work units related to the execution thread;
wherein each work unit includes one or more associated processing tasks;
writing by the CPU, each of the work units to a buffer;
assigning by the CPU, one or more of the plurality of work units to a graphics processing unit (GPU);
halting the processing of the execution thread by the CPU;
entering by the CPU, an interrupt mode from a polling mode;
accessing the one or more of the plurality of work units by the GPU from the buffer;
executing, by the GPU, one or more associated processing tasks included in each of the one or more of the plurality of work units;
writing, by the GPU, an indication of progress of executing the one or more associated processing tasks included in each of the one or more of the plurality of work units in a memory;
sending an interrupt signal to the CPU by the GPU dependent upon completion of a subset of the one or more work units, wherein a particular work unit is complete when the one or more associated processing tasks included in the particular work unit have finished executing;
repeatedly reading the indication of progress from the memory by the CPU;
estimating, by the CPU, an amount of work remaining to be performed by the GPU based on the indication of progress;
switching, by the CPU, from the interrupt mode to the polling mode in response to determining that the amount of work remaining is less than a threshold value, wherein the threshold value is dependent upon an operational mode of the CPU, and wherein the operational mode is one of at least a high performance mode or a low performance mode;
while operating in the interrupt mode, resuming processing of the execution thread by the CPU in response to a determination that a first time period has elapsed or in response to receiving the interrupt signal from the GPU; and
while operating in the polling mode, resuming processing of the execution thread by the CPU in response to determining that a second time period has elapsed or in response to receiving the interrupt signal from the GPU, wherein the second time period is less than the first time period.

5. The method of claim 4, further comprising synchronizing the operation of the first processor with the operation of the second processor.

6. The method of claim 4, further comprising switching, by the first processor, from the interrupt mode to the polling mode in response to detecting a timeout event.

7. A non-transitory computer accessible storage medium having program instructions stored therein that, in response to execution by a computer system, causes the computer to perform operations including:
processing an execution thread by a central processing unit (CPU);
generating, by the CPU, a plurality of work units related to the execution thread;
wherein each work unit includes one or more associated processing tasks;
writing by the CPU, each of the work units to a buffer;
assigning by the CPU, one or more of the plurality of work units to a graphics processing unit (GPU);
halting the processing of the execution thread by the CPU;
entering by the CPU, an interrupt mode from a polling mode;

accessing the one or more of the plurality of work units by the GPU from the buffer; and executing, by the GPU, one or more associated processing tasks included in each of the one or more of the plurality of work units;

writing, by the GPU, an indication of progress of executing the one or more associated processing tasks included in each of the one or more of the plurality of work units in a memory;

sending an interrupt signal to the CPU by the GPU dependent upon completion of a subset of the one or more work units, wherein a particular work unit is complete when the one or more associated processing tasks included in the particular work unit have finished executing;

repeatedly reading the indication of progress from the memory by the CPU;

estimating, by the CPU, an amount of work remaining to be performed by the GPU based on the indication of progress;

switching, by the CPU, from the interrupt mode to the polling mode in response to determining that the amount of work remaining is less than a threshold value, wherein the threshold value is dependent upon an operational mode of the CPU, and wherein the operational mode is one of at least a high performance mode or a low performance mode;

while operating in the interrupt mode, resuming processing of the execution thread by the CPU in response to a determination that a first time period has elapsed or in response to receiving the interrupt signal from the GPU; and while operating in the polling mode, resuming processing of the execution thread by the CPU in response to determining that a second time period has elapsed or in response to receiving the interrupt signal from the GPU, wherein the second time period is less than the first time period.

8. The non-transitory computer accessible storage medium of claim 7, wherein the operations further include synchronizing the operation of the first processor with the operation of the second processor.

* * * * *